United States Patent [19]

Eccleston

[11] Patent Number: 5,241,241
[45] Date of Patent: Aug. 31, 1993

[54] STOP LIGHT CONVERTER FOR DUAL STOP AND TURN LAMPS

[75] Inventor: Larry Eccleston, Marshall, Mich.

[73] Assignee: Tekonsha Engineering Company, Tekonsha, Mich.

[21] Appl. No.: 807,265

[22] Filed: Dec. 13, 1991

[51] Int. Cl.⁵ .................. H05B 37/00; B60Q 1/46
[52] U.S. Cl. .......................... 315/82; 315/77; 315/83; 307/108; 340/431
[58] Field of Search ............... 315/77, 82, 83; 340/431; 307/10.1, 10.8

[56] References Cited

U.S. PATENT DOCUMENTS

| | | | |
|---|---|---|---|
| 4,005,313 | 1/1977 | Tibbits | 307/10.1 |
| 4,006,453 | 2/1977 | Bryant | 340/431 |
| 4,064,413 | 12/1977 | Anderson | 315/77 |
| 4,270,115 | 5/1981 | Bonnett | 340/431 |
| 4,751,431 | 6/1988 | Ducote | 315/77 |
| 4,859,982 | 8/1989 | Seaburg | 307/10.8 X |
| 4,939,503 | 7/1990 | Swanson | 340/431 X |
| 5,030,938 | 7/1991 | Bondzeit | 340/431 |

Primary Examiner—Eugene R. LaRoche
Assistant Examiner—Son Dinh
Attorney, Agent, or Firm—Price, Heneveld, Cooper, DeWitt & Litton

[57] ABSTRACT

A towed vehicle conversion and isolation circuit is disclosed for coupling dual stop and turn indicator lamps on a towed vehicle to towing vehicles having either dual stop and turn lamps or separate stop and turn lamps. Additionally, the circuit provides a small load to the towing vehicle signaling circuit and isolates the towed vehicle indicator lamps from the towing vehicle signal circuits. Furthermore, the circuit may be coupled to the towed vehicle brake coils to illuminate the towed vehicle lamps responsive to manual actuation of the towed vehicle brake for providing energizing current to the indicator lamps.

20 Claims, 1 Drawing Sheet

STOP LIGHT CONVERTER FOR DUAL STOP AND TURN LAMPS

BACKGROUND OF THE INVENTION

This invention relates to circuits for driving vehicle directional and stop indicator lamps, such as those used to drive the left and right turn and stop lamps on a towed vehicle (i.e., trailer) in response to control signals from the towing vehicle. More particularly, the invention relates to a drive circuit of the general type noted above which controls the towed vehicle indicator lamps responsive to corresponding towing vehicle lamp actuation involving different indicator lamp formats, as well as providing towed vehicle brake lamp illumination responsive to actuation of the towed vehicle brakes from the towing vehicle.

In the past, towed vehicle lamp drive circuits have progressed from relatively simple and crude circuits which did no more than connect the towed vehicle directional and stop indicator lamps to the towing vehicle signalling circuit, to interface circuits which allow the directional and stop indicator lamps on the towed vehicle to be connected to towing vehicles having different indicator lamp formats. For example, Bryant U.S. Pat. No. 4,006,453 shows an interface circuit for connecting towed vehicles having dual stop and turn indicator lamps to towing vehicles having either independent brake and turn indicator lamps or dual stop and turn indicator lamps. While the aforementioned state of the art-type systems no doubt have advantages and favorable features compared to past practices, they also have limitations and undesirable attributes. For example, known interface circuits such as Bryant couple the towed vehicle indicator lamps in parallel with the towing vehicle's indicator lamps. The parallel connection interferes with towing vehicle lamp sensing circuitry, which automobile manufacturers often incorporate in vehicles to sense and display the condition of the various lamps on the towing vehicle, as the towed vehicle lamps may draw current even when the towing vehicle lamps do not illuminate. Consequently, when a towed vehicle's indicator lamps are connected in parallel with the towing vehicle's lamps, the towing vehicle sensors will not reliably monitor the condition of lamps on the towing vehicle due to the additional current drawn by the towed vehicle lamps.

Another undesirable characteristic of state of the art-type systems is they do not adequately isolate the towed vehicle indicator lamps from the towing vehicle signal circuits. In some areas, it is required that towed vehicle brake lamps be illuminated whenever the towed vehicle's brakes are actuated, even though this may only involve momentary manual actuation from the towing vehicle for purposes of stabilizing the towed vehicle rather than slowing it. However, due to inadequate isolation of the towing and towed vehicle signal circuits, actuation of the towed vehicle brakes may adversely and undesirably affect operation of the towing vehicle. For example, where the towing and towed vehicle signal circuits are not adequately isolated, such manual actuation of the towed vehicle brakes will cause a brake signal to occur in the towing vehicle signal circuits. When such a signal occurs on the towing vehicle signal circuit, the signal deactivates the towing vehicle cruise control, locks out the towing vehicle torque converter, and injects a rich idle fuel mixture in the towing vehicle engine. Consequently, when the vehicle operator manually actuates the brake controller briefly to stabilize the towed vehicle, both the towing vehicle and towed vehicle will slow down due to the brake signal appearing of the towing vehicle signal line. However, such slowing down on the towing vehicle tends to further destabilize the towed vehicle, making the problem worse or, in any event, making it more difficult for the towing vehicle operator to stop towed vehicle swaying by the usual procedure of manual actuation of the towed vehicle brakes without corresponding braking of the tow vehicle.

Another undesirable result of inadequate isolation of the towed and towing vehicle signalling circuits is the increased load on the towing vehicle turn signal circuit by the addition of the towed vehicle lamps. The additional current drawn by the towed vehicle lamps may damage the signalling circuit on the towing vehicles since they are not usually designed for such high levels of current flow and are not likely to have adequate current-handling ability. Additionally, the increased load on the towing vehicle signaling circuit may cause the turn signals to flash at an undesirably rapid rate.

BRIEF DESCRIPTION AND FEATURES OF THE PRESENT INVENTION

The present invention effectively resolves the problems described above which characterize known vehicle signaling circuits. In accordance with the invention, a new and more effective converter and driver is provided through the combined effect of a number of distinct features which vary in both concept and implementation from those found in the prior art and which combine synergistically to provide a stop and directional lamp driver which is both more effective and more efficient than those utilized heretofore.

More particularly, the converter and driver of the present invention is more flexible in use and provides better isolation than prior art devices. More specifically considered, some of the more salient attributes of the present invention include a logic interface coupled between the towing vehicle signal circuit and towed vehicle indicator lamp drivers which avoids loading of the towing vehicle signaling circuit, together with a new form of current control or output driver responsive to the output of the logic interface for driving the towed vehicle brake lamps.

In a still more particular sense, the present invention provides a new form of electronic controller for electric brake lamps which includes digital logic elements providing versatile signal conversion and isolating the towing vehicle signal circuit, together with power MOSFETs which more effectively and advantageously control the current supplied to the towed vehicle lamps.

The foregoing features and attributes of the invention will become more apparent after contemplation of the ensuing more detailed description, particularly when considered with and in light of the accompanying drawing.

BRIEF DESCRIPTION OF THE DRAWING

The drawing figure is a schematic circuit diagram showing an electronic converter and controller in accordance with the invention.

DESCRIPTION OF THE PREFERRED EMBODIMENT

Figure 1:
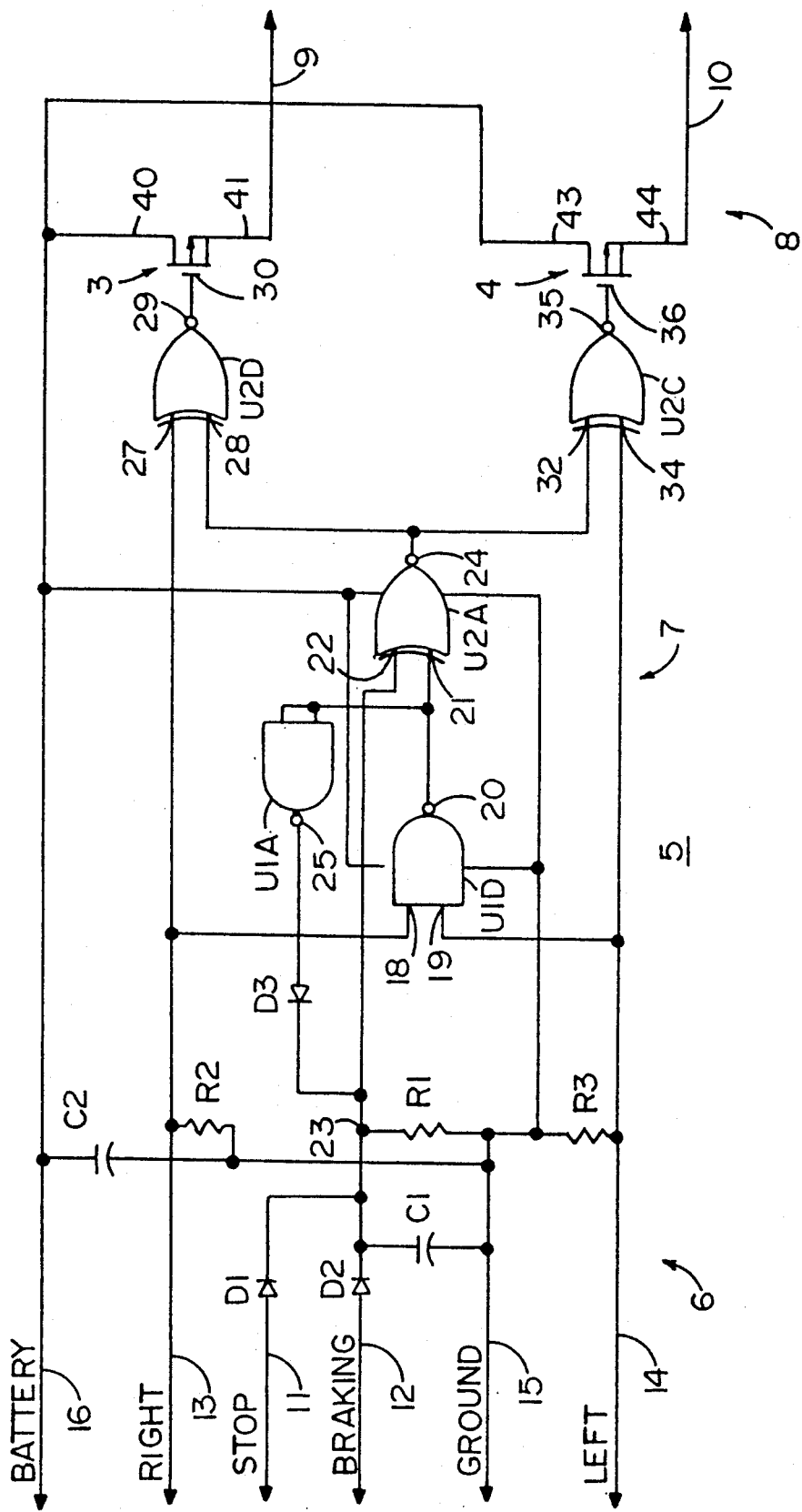

Referring now to the drawing, and the illustrated embodiment depicted therein, an isolation and conversion circuit 5 is illustrated which generally includes an input stage 6, a logic circuit 7, and an output stage 8 which comprises MOSFET elements. Output stage 8 has a pair of output conductors 9 and 10 which comprise the connection to the towed vehicle indicator lamps (not shown), each such lamp comprising a dual purpose (i.e. combined) signal stop and turn lamp. Output stage 8 provides MOSFET elements 3 and 4 for supplying energizing current to the towed vehicle brake lamps responsive to the control signals from logic circuit 7.

Input stage 6 includes connections for coupling to towing vehicles having combined stop and turn lamps as well as vehicles having separate stop and turn lamps, and accordingly it will be understood that the input stage will be connected to the towing vehicle according to the particular signaling format of the towing vehicle. Thus, when the towing vehicle signal circuit comprises combined stop and turn lamps, wherein a single right lamp and left lamp each provide both turn and stop signaling, a stop input 11 will be connected to ground, a right signal input 13 will be connected to the right turn and stop lead (for the right side signal lamp) on the towing vehicle, and a left signal input 14 will be connected to the left turn and stop lead for the left signal lamp on the towing vehicle. On the other hand, when the towing vehicle comprises separate stop and turn lamps, the stop input 11 will be coupled to the stop lamp signal lead on the towing vehicle, the right input 13 will be coupled to the right turn signal lead on the towing vehicle, and the left input 14 will be coupled to the left turn signal lead on the towing vehicle. In those areas which require stop lamp illumination of the towed vehicle indicator lamps upon any actuation of the towed vehicle brakes, whether the towed vehicle uses dual-purpose (combined) stop and turn lamps or separate stop and turn lamps, a brake-actuation input 12 is coupled to the towed vehicle electromagnet brake-actuation coils (not shown) to sense the braking current supplied thereto.

More particularly, input stage 6 comprises analog components for connecting logic circuit 7 with the towing vehicle signal circuit and the conductor(s) which energize the towed vehicle brake coils. Because the current which drives the towed vehicle brake coils may be applied in the form of energizing pulses, a capacitor C1 and resistor R1 are connected in parallel between a junction 23 and ground 15 to act as a sample-and-hold circuit at low duty cycles, whereby a narrow spike received at braking input 12 will result in stop lamp illumination even though the pulse width is very small. Capacitor C1 will be refreshed every three milliseconds by a 300 Hz brake-actuation input signal, and resistor R1 will discharge this capacitor when pulses cease. Input stage 6 further includes a capacitor C2 coupled between 12 volt battery input 16 and ground 15 to filter out noise present on the battery circuit input 16, which would adversely affect the circuitry elements connected to input 16. A resistor R2 is connected between right signal input 13 and ground 15, and a resistor R3 is connected between left signal input 14 and ground 15, to provide protection for the logic elements in logic circuit 7 by dissipating current that would otherwise be input thereto.

Logic circuit 7 is utilized to isolate the input stage 6 from the output stage 8 as well as to provide control signals for the output stage, and may be implemented by NAND GATEs U1A and U1D and EXCLUSIVE NOR GATEs U2A, U2C and U2D. The NAND GATEs and EXCLUSIVE NOR GATEs are preferably CMOS logic gates, and more specifically, the NAND GATES may be implemented by commercially available IC. No. 4011 while the EXCLUSIVE NOR GATEs may be implemented by commercially available IC No. 4077. By using CMOS logic gates the towed vehicle signal circuit will draw only a very small leakage current from the towing vehicle signal circuit unless. The voltages on the respective logic inputs exceed the breakdown voltage of internal zener diodes connected to each logic input of the CMOS gates. Additionally, the CMOS logic gates may be powered by relatively widely varying supply voltages without detrimentally affecting or damaging the logic gates or their operation. As utilized in the present application, the NAND GATE U1D has an input 18 coupled to right signal input 13, an input 19 coupled to left signal input 14, and an output 20 connected to both inputs of NAND GATE U1A, which acts as a logic inverter. EXCLUSIVE NOR GATE U2A also, has an input 21 coupled to output 20 of NAND GATE U1D, and an input 22 coupled to the aforementioned junction 23, together with an output 24. Junction 23 is coupled via diodes D1, D2 and D3 to stop input 11, brake-actuation electromagnet input 12, and output 25 of NAND GATE U1A, respectively, whereby junction 23 may only be connected to one of input 11, input 12 and output 25 at a time. EXCLUSIVE NOR GATE U2D has an input 27 coupled to the right signal input 13 and an input 28 connected to EXCLUSIVE NOR GATE U2A output 24, and an output 29 coupled to gate 30 of MOSFET Q1. EXCLUSIVE NOR GATE U2C has an input 32 coupled to left signal input 14, an input 34 connected to EXCLUSIVE NOR GATE U2A output 24, and an output 35 coupled to gate 36 of MOSFET Q2.

Output stage 8 basically comprises first and second MOSFETS Q1 and Q2, which may for example be implemented by the use of a commercially available p-channel MOSFET identified as No. BU-171. As indicated above, gate 30 of MOSFET Q1 is connected to output 29 of EXCLUSIVE NOR GATE U2D and gate 36 of MOSFET Q2 is coupled to output 35 of EXCLUSIVE NOR GATE U2C, whereby Q1 and Q2 are controlled by logic circuit 7, in a manner described below. A drain 40 of MOSFET Q1 is coupled to receive power from 12-volt battery input 16 and a source 41 of MOSFET Q1 is connected to the right output conductor 9. A drain 43 of MOSFET Q2 is similarly connected to 12-volt battery input 16 and a source 44 of MOSFET Q2 is connected to left output conductor 10. Output stage 8 is accordingly coupled to selectively supply energizing current to the towed vehicle brake lamps which are connected to output conductors 9 and 10, responsive to control signals output from logic circuit 7.

In operation, the towed vehicle indicator lamps will be illuminated to indicate braking responsive to the control signals supplied by different forms of towing vehicle signal circuits and, optionally, by manual actuation of the towed vehicle brakes. Thus, when circuit inputs 13 and 14 are simultaneously energized by having positive signals characterizing high logic levels applied thereto, NAND GATEs U1D and U1A will generate opposite logic levels on their outputs, which are applied to respective inputs of EXCLUSIVE NOR GATE U2A. Gate U2A will in turn generate a low logic level on output 24. Accordingly, inputs 27 and 28 of gate U2D will have opposite logic levels applied thereto and inputs 32 and 34 of gate U2C will have opposite logic levels applied thereto, whereupon EXCLUSIVE NOR GATEs U2C and U2D will generate low logic levels at their respective outputs which enable elements Q1 and Q2 to supply an energizing current in both output conductors 9 and 10, thereby illuminating the indicator lamps coupled thereto. On the other hand, when circuit inputs 11-14 are not energized, and thus have low logic levels thereon, NAND GATEs U1D and U1A will generate opposite-character logic levels, which are applied to EXCLUSIVE NOR GATE U2A, which in turn will generate a low logic level on output 24. Accordingly, gate inputs 27, 28, 32, and 34 will all have low logic levels applied thereto and EXCLUSIVE NOR GATEs U2C and U2D will output a high logic level. Accordingly, the indicator lamps coupled to outputs 9 and 10 will not then be illuminated. However, if either circuit input 11 or 12 has a high logic level applied to it when both inputs 13 and 14 have low logic levels thereon, the output of EXCLUSIVE NOR GATE U2A will have a high logic level thereon, causing EXCLUSIVE NOR GATE U2C and U2D to output low logic levels, responsive to which elements Q1 and Q2 supply energizing current through output conductors 9 and 10 to illuminate the indicator lamps coupled thereto.

The left and right towed vehicle lamps coupled to output conductors 9 and 10 will flash to provide a turn signal whenever one of circuit inputs 13 and 14 switches between high and low logic levels. Thus, when inputs 13 and 14 have opposite logic levels thereon, one of the EXCLUSIVE NOR GATEs U2C and U2D will have a low logic level output, whereby an energizing current will be supplied by whichever transistor, Q1 or Q2, has the low logic level applied to the gate thereof. Accordingly, when converter circuit 5 is coupled to a towing vehicle having dual stop and turn indicator lamps, and the brake actuation input 12 is at a low logic level or ground, the towed vehicle lamps will be illuminated in direct correspondence with the towing vehicle indicator lamps, since circuit 5 then acts as a follower, and thus will flash the towed vehicle signal lamps with the towing vehicle indicator lamps. However, when circuit 5 receives a brake signal from stop input 11 or braking input 12, circuit 5 will act as an inverter with respect to the towed vehicle's right and left lamps, whereby the towed vehicle lamps coupled to elements Q1 and Q2 will flash inversely from the towing vehicle's right and left lamps, respectively.

In summary, it may thus be seen that the relationship between input signals and output lamps is represented by the following table when the stop input 11 and the braking input 12 are coupled to ground.

TABLE I

| Right Stop/Turn Input | Left Stop/turn Input | Towed Vehicle Right Lamp | Towed Vehicle Left Lamp |
| --- | --- | --- | --- |
| High | High | On | On |
| High | Low | On | Off |
| Low | High | Off | On |

TABLE I-continued

| Right Stop/Turn Input | Left Stop/turn Input | Towed Vehicle Right Lamp | Towed Vehicle Left Lamp |
| --- | --- | --- | --- |
| Low | Low | Off | Off |

As illustrated in Table I, when both the right and left stop/turn inputs of the converter circuit 5 have a high logic level thereon, both the right and left towed vehicle lamps will be "on." Furthermore, when both the left and right stop/turn inputs have a low logic level thereon, then both the right and left towed vehicle lamps will be "off." On the other hand, when only the right or the left stop/turn input has a high logic level thereon, the right or left lamp, respectively, will be "on." Thus, when the right or left stop/turn inputs switch between high and low logic levels, as when a tow vehicle turn signal is being given, the right or left towed vehicle lamps, respectively, will flash. Furthermore, when the right and left inputs are held at a high logic level, the right and left lamps of the towed vehicle will remain "on", indicating braking.

Table II below illustrates the relationship between inputs 11, 12, 13 and 14 when the stop input or the brake actuation input receives a positive input signal.

TABLE II

| Right Turn Input | Left Turn Input | Stop and/or Braking Input | Right Lamp | Left Lamp |
| --- | --- | --- | --- | --- |
| High | High | High | On | On |
| High | Low | High | Off | On |
| Low | High | High | On | Off |
| Low | Low | High | On | On |
| High | High | Low | On | On |
| High | Low | Low | On | Off |
| Low | High | Low | Off | On |
| Low | Low | Low | Off | Off |

It will thus be seen that when the trailer brake input 12 and the stop input 11 have a low logic level thereon, the circuit 5 operates the same as when the braking and stoplight inputs are both connected to the ground. It will also be seen that when the stop input 11 or the braking input 12 have a high logic level thereon, and both the right and left turn inputs have the same logic level thereon, the right and left trailer lamps will be on, and thus provide an indication of towing vehicle braking. On the other hand, when either the stop input or the braking input has a high logic level applied thereto, simultaneously with only one of the right and left turn inputs having a high logic level thereon, one of the right and left lamps will be off while the other of the right and left lamps will be on, whereby the right or left lamp will flash with a switching signal on left signal input 13 or right signal input 14.

Accordingly, it will be appreciated, that a novel converter or logical interface circuit is disclosed which interconnects towed and towing vehicle lamp signal actuation circuits in a manner which isolates the towed and towing vehicle circuits from one another, whereby the towed vehicle indicator lamps are not connected in parallel with the towing vehicle indicator lamps, do not load the towing vehicle control circuit, and ensures that brake signals applied to the towed vehicle lamps are not transmitted to the towing vehicle signal circuit. Additionally, the novel conversion and interface circuit provides versatility, since it may be used with equal facility with towing vehicles having different signal formats.

It is to be understood that the foregoing description of the preferred embodiment of the invention is provided for purposes of description and illustration, and not as a measure of the invention, whose scope is to be defined by reference to the ensuing claims. Thus, those skilled in the art may devise embodiments of the particular concepts presented in the foregoing illustrative disclosure which differ from the particular embodiments shown and described in detail herein, or may make various changes in structural details to the illustrated embodiment. Accordingly, all such alternative or modified embodiments which utilize the underlying concepts of the invention and incorporate the spirit thereof are to be considered as within the scope of the claims appended therebelow, unless such claims by their language specifically state otherwise.

The embodiments of the invention in which an exclusive property or privilege is claimed are defined as follows:

1. An interface apparatus for providing energizing current to activate indicator lamps on a towed vehicle responsive to a towing vehicle signaling circuit, comprising:

an isolation and control circuit having at least one input adapted to be coupled to said towing vehicle signaling circuit and having first and second output terminals, together with means for isolating said one input and a towing vehicle signal circuit coupled thereto from said first and second output terminals in a manner such that signals appearing on said first and second output terminals do not appear on said one input, and means for applying first and second output control signals to said first and second output terminals in response to operation of said towing vehicle signaling circuit, said at least one input of said isolation and control circuit includes a first input, a second input, a third input, said first and second inputs adapted to be separately coupled to opposite turn-signaling portions of said towing vehicle signaling circuit, isolating means including first and second logic gates coupled to said first and second inputs respectively and generating said first and second output control signals, and said third input adapted to be coupled to the towed vehicle brakes to receive a towed vehicle brake signal, a logic means having an input coupled to said third input and an output coupled to at last one input of said first and second logic gates, said logic means including a third logic gate responsive to said towed vehicle brake signal to output a third control signal to said first and second logic gates; and an output driver for energizing said towed vehicle lamps responsive to said first and second output control signals.

2. The apparatus as defined in claim 1, wherein said output driver includes at least one MOSFET element having a first input to be connected to a battery on said towing vehicle, a control input coupled to receive at least one of said control signals, and an output to be coupled to at least one towed vehicle indicator lamp.

3. The apparatus as defined in claim 1, wherein said first, second and third logic gates are CMOS logic gates.

4. The apparatus as defined in claim 1, wherein said logic means includes at least one NAND GATE.

5. The apparatus as defined in claim 1, wherein said logic means includes at least one EXCLUSIVE NOR gate.

6. The apparatus as defined in claim 1, wherein said first logic gate includes a first EXCLUSIVE NOR gate having an input coupled to said first input.

7. The apparatus as defined in claim 6, wherein said second logic gate includes a second EXCLUSIVE NOR gate having an input coupled to said second input.

8. The apparatus as defined in claim 7, wherein said logic means includes a third EXCLUSIVE NOR gate having an output coupled to an input of said first and second EXCLUSIVE NOR gates.

9. The apparatus as defined in claim 8, wherein said logic gates are CMOS logic gates.

10. An interface apparatus for providing energizing current to activate indicator lamps on a towed vehicle responsive to a towing vehicle signaling circuit, comprising:

an isolation and control circuit having at least one input adapted to be coupled to said towing vehicle signaling circuit and having first and second output terminals, together with means for isolating said one input and a towing vehicle signal circuit coupled thereto from said first and second output terminals in a manner such that signals appearing on said first and second output terminals do not appear on said one input, and means for applying first and second output control signals to said first and second output terminals in response to operation of said towing vehicle signaling circuit, said at least one input of said isolation and control circuit includes a first input, a second input, and a third input, said first and second inputs adapted to be separately coupled to opposite turn-signaling portions of said towing vehicle signaling circuit, isolating means including first and second logic gates coupled to said first and second inputs respectively and generating said first and second output control signals, and said third input adapted to be coupled to a stop signaling portion of the towing vehicle signaling circuit, a logic means having an input coupled to aid third input and an output coupled to said first and second logic gates, said logic means including a third logic gate responsive to said vehicle brake signal to output a third control signal to said first and second logic gates; and an output driver for energizing said towed vehicle lamps responsive to said control signals;

wherein said isolation and control circuit further includes a fourth input adapted to be selectively coupled to the towed vehicle brakes, said logic means having an input coupled to said fourth input.

11. The apparatus as defined in claim 10, wherein said logic means includes a junction coupled to said third and forth inputs by respective diodes, said third logic gate having an input coupled to said junction.

12. An interface apparatus for providing energizing current to activate indicator lamps on a towed vehicle responsive to a towing vehicle signaling circuit, comprising:

an isolation and control circuit having at least one input adapted to be coupled to said towing vehicle signaling circuit and having at least one output terminal, together with means for isolating said one input and a towing vehicle signal circuit coupled thereto from said at least one output terminal in manner such that signals appearing on said at least one output terminal do not appear on said one input, and means for applying an output control signal to said one output terminal in response to operation of said towing vehicle signalling circuit, wherein said isolation and control circuit includes input means for generating a signal indicating that the towed vehicle brakes are actuated, said input means including an input terminal adapted to be coupled to said towed vehicle brakes to receive a signal current when the towed vehicle brakes are actuated and having an output terminal connected to said isolating means; and an output driver for energizing said towed vehicle lamps responsive to said control signal.

13. The apparatus as defined in claim 12, wherein said input means includes means for sampling and holding pulses of current received from said towed vehicle brakes at said input terminal of said input means, said means for sampling and holding applying an output signal to said output terminal of said input means.

14. An interface apparatus for providing energizing current to activate indicator lamps on a towed vehicle in response to signals from a towing vehicle circuit, comprising:

logic means for coupling to said towing vehicle circuit to receive said signals therefrom and outputting logically ordered control signals based upon said signals;

MOSFET elements coupled to said logic means for outputting said energizing current activating said indicator lamps responsive to said control signals; and input means including a first input adapted to be coupled to a left turn signal lead on the towing vehicle, a second input adapted to be coupled to a right turn signal lead on said towing vehicle, a third input adapted to be coupled to a stop signal lead, and a fourth input adapted to be coupled to receive the towed vehicle brake current, and wherein said logic means is connected to said input means to receive said inputs.

15. The apparatus as defined in claim 14, wherein said logic means includes at least one CMOS logic gate.

16. A method of illuminating dual stop and turn indicator lamps on a towed vehicle in response to towing vehicle signal operation, comprising the steps of:

acquiring input signals corresponding to the stop and turn signal excitation of the towing vehicle and the towed vehicle brake current, logically processing said input signals to develop corresponding but logically reordered output control signals; and using said output control signals to actuate drive means for illuminating said stop and turn indicator lamps of the towed vehicle in a manner electrically isolating such towed vehicle drive means from said towing vehicle signal excitation.

17. The apparatus as defined in claim 14, wherein said input means includes means for selectively isolating said third and fourth inputs.

18. The apparatus as defined in claim 17, wherein said means for selectively isolating includes switches connected to a junction and to said third and fourth inputs, said switches selectively isolating said third and fourth inputs from said junction whereby a signal on said third and fourth inputs are not applied to said fourth and third inputs, respectively.

19. The method as defined in claim 16, further, including the step of selectively isolating said third and fourth inputs.

20. The method as defined in claim 19, wherein said step of selectively isolating includes switching the third and fourth inputs whereby signals on said third and fourth input are not applied to said fourth and third inputs, respectively.

* * * * *

UNITED STATES PATENT AND TRADEMARK OFFICE
CERTIFICATE OF CORRECTION

PATENT NO. :   5,241,241
DATED      :   August 31, 1993
INVENTOR(S):   Larry (NMI) Eccleston It is certified that error appears in the above-indentified patent and that said Letters Patent is hereby corrected as shown below:

Col. 8, line 43, claim 10
"aid" should ---said---

Signed and Sealed this

Nineteenth Day of July, 1994

Attest:

BRUCE LEHMAN

*Attesting Officer*              *Commissioner of Patents and Trademarks*